(12) United States Patent
Moon et al.

(10) Patent No.: US 10,676,654 B2
(45) Date of Patent: Jun. 9, 2020

(54) ADHESIVE FILM, OPTICAL MEMBER COMPRISING THE SAME AND OPTICAL DISPLAY COMPRISING THE SAME

(71) Applicants: SAMSUNG SDI CO., LTD., Yongin-si, Gyeonggi-do (KR); SAMSUNG ELECTRONICS CO., LTD., Suwon-si, Gyeonggi-do (KR)

(72) Inventors: Hyung Rang Moon, Suwon-si (KR); Byeong Do Kwak, Suwon-si (KR); Il Jin Kim, Suwon-si (KR); Ji Ho Kim, Suwon-si (KR); Sung Hyun Mun, Suwon-si (KR); Seon Hee Shin, Suwon-si (KR); Gwang Hwan Lee, Suwon-si (KR); Jin Young Lee, Suwon-si (KR); Ik Hwan Cho, Suwon-si (KR); Jae Hyun Han, Suwon-si (KR)

(73) Assignees: Samsung SDI Co., Ltd., Yongin-si (KR); Samsung Electronics Co., Ltd., Suwon-si (KR)

( * ) Notice: Subject to any disclaimer, the term of this patent is extended or adjusted under 35 U.S.C. 154(b) by 32 days.

(21) Appl. No.: 15/491,699

(22) Filed: Apr. 19, 2017

(65) Prior Publication Data
US 2017/0306193 A1 Oct. 26, 2017

(30) Foreign Application Priority Data

Apr. 22, 2016 (KR) .................. 10-2016-0049266
Dec. 14, 2016 (KR) .................. 10-2016-0170837

(51) Int. Cl.
*C09J 133/08* (2006.01)
(52) U.S. Cl.
CPC ................. *C09J 133/08* (2013.01)

(58) Field of Classification Search
CPC ........... C09J 133/08; C09J 7/00; C09J 7/0246
See application file for complete search history.

(56) References Cited

U.S. PATENT DOCUMENTS

| 5,162,432 A | 11/1992 | Machado |
| 6,291,593 B1 | 9/2001 | Cheng |

(Continued)

FOREIGN PATENT DOCUMENTS

| CN | 1763112 A | 4/2006 |
| CN | 1764679 A | 4/2006 |

(Continued)

OTHER PUBLICATIONS

Taiwan Office action dated Sep. 9, 2016, corresponding to Taiwanese Patent Application No. 104135962 (7 pages).

(Continued)

*Primary Examiner* — Victor S Chang
(74) *Attorney, Agent, or Firm* — Lewis Roca Rothgerber Christie LLP

(57) ABSTRACT

An adhesive film, an optical member including the same, and an optical display including the same are provided. The adhesive film is formed of a monomer mixture including a hydroxyl group-containing (meth)acrylate and an alkyl group-containing (meth)acrylate, and has a bubble generation area ratio of 0%, as measured on a specimen (length× width: 13 cm×3 cm) by repeating the described cycle 10 times, in which the specimen is prepared by sequentially stacking a polyethylene terephthalate film (thickness: 50 μm), the adhesive film (thickness: 100 μm) and a polyethylene terephthalate film (thickness: 100 μm) to have a three-layer structure, and is bent towards the PET film (thickness: 50 μm) such that the specimen is placed between (Continued)

frames having a gap of about 1 cm therebetween and the length of the specimen is halved and the cycle is sequentially accomplished for 24 hours.

19 Claims, 5 Drawing Sheets

(56) References Cited

U.S. PATENT DOCUMENTS

| | | |
|---|---|---|
| 2005/0154140 A1 | 7/2005 | Hong et al. |
| 2005/0181148 A1 | 8/2005 | Kim et al. |
| 2007/0149715 A1 | 6/2007 | Lee et al. |
| 2009/0179035 A1 | 7/2009 | Agarwal et al. |
| 2009/0298969 A1 | 12/2009 | Attarwala et al. |
| 2012/0100359 A1* | 4/2012 | Kishioka ............ C09J 133/08 428/220 |
| 2013/0052457 A1* | 2/2013 | Inui .................... C08F 265/06 428/336 |
| 2014/0065416 A1 | 3/2014 | Niwa et al. |
| 2014/0139447 A1 | 5/2014 | Kang et al. |
| 2014/0162044 A1 | 6/2014 | Lee et al. |
| 2014/0267950 A1 | 9/2014 | Kang et al. |
| 2016/0122600 A1 | 5/2016 | Moon et al. |
| 2016/0177146 A1 | 6/2016 | Mun et al. |
| 2017/0002237 A1 | 1/2017 | Cho et al. |
| 2017/0015880 A1 | 1/2017 | Kim et al. |

FOREIGN PATENT DOCUMENTS

| | | |
|---|---|---|
| CN | 101679709 A | 3/2010 |
| CN | 102753635 A | 10/2012 |
| CN | 102855822 A | 1/2013 |
| CN | 102933677 A | 2/2013 |
| CN | 103160217 | 6/2013 |
| CN | 103328526 A | 9/2013 |
| CN | 103865411 | 6/2014 |
| CN | 103897620 A | 7/2014 |
| CN | 104231952 A | 12/2014 |
| CN | 105567137 A | 5/2016 |
| CN | 106010318 A | 10/2016 |
| JP | H09-278837 A | 10/1997 |
| JP | 2006-301572 | 11/2006 |
| JP | 2007-176542 A | 7/2007 |
| JP | 2008-37101 A | 2/2008 |
| JP | 4750410 B2 | 8/2011 |
| KR | 10-2014-0148278 A | 12/2004 |
| KR | 10-2005-0056158 A | 6/2005 |
| KR | 10-2007-0055363 A | 5/2007 |
| KR | 10-2008-0052897 A | 6/2008 |
| KR | 10-2010-0002638 A | 1/2010 |
| KR | 10-2010-0075726 A | 7/2010 |
| KR | 10-2012-0125699 A | 11/2012 |
| KR | 10-2014-0076425 A | 6/2014 |
| KR | 10-2014-0085259 A | 7/2014 |
| KR | 10-2014-0085299 A | 7/2014 |
| KR | 10-2014-0090737 A | 7/2014 |
| KR | 10-2014-0102132 A | 8/2014 |
| KR | 10-2014-0111884 A | 9/2014 |
| KR | 10-2016-0030235 A | 3/2016 |
| TW | 200724635 A | 7/2007 |
| TW | 201300474 A | 1/2013 |
| TW | 201300478 A | 1/2013 |
| TW | 201420715 A | 6/2014 |
| TW | 2014-30085 A | 8/2014 |
| TW | 201430091 A | 8/2014 |
| WO | WO 2012/124908 A2 | 9/2012 |
| WO | WO 2012/138030 A1 | 10/2012 |
| WO | WO 2013/176364 A1 | 11/2013 |
| WO | WO 2014/027788 A1 | 2/2014 |
| WO | WO 2015/155844 A1 | 10/2015 |

OTHER PUBLICATIONS

Chinese Office Action dated Dec. 18, 2017 in corresponding Chinese Patent Application No. 201510729509.4 (9 pages).
U.S. Office Action dated Mar. 5, 2018, issued in U.S. Appl. No. 14/976,408 (18 pages).
International Search Report corresponding to PCT Application No. PCT/KR2015/011603, dated Mar. 31, 2016, with English Translation (4 pages).
Written Opinion corresponding to PCT Application No. PCT/KR2015/011603, dated Mar. 31, 2016, with English Translation (5 pages).
TIPO Office Action dated Dec. 7, 2016, corresponding to Taiwanese Patent Application No. 105110178 (13 pages).
KIPO Office Action dated May 22, 2017 for Korean Patent Application No. 10-2015-0093811 (8 pages).
Taiwan Office action dated Aug. 9, 2017, corresponding to Taiwan Application No. 105120402 (9 pages).
European Search Report for corresponding European Application No. 15854252.2, European Search Report dated May 14, 2018 (14 pgs.).
Chinese Office action dated Nov. 2, 2018, corresponding to Chinese Patent Application No. 201610491631.7 (11 pages).
U.S. Office Action dated Jul. 26, 2017, issued in U.S. Appl. No. 14/923,520 (10 pages).
U.S. Office Action dated May 16, 2018, issued in U.S. Appl. No. 14/923,520 (7 pages).
U.S. Final Office Action dated Jan. 17, 2019, issued in U.S. Appl. No. 15/198,977 (13 pages).
U.S. Office Action dated Mar. 22, 2019, issued in U.S. Appl. No. 15/522,253 (22 pages).
Korean Office Action dated Jan. 28, 2019 in corresponding Korean Patent Application No. 10-2016-0170837 (5 pgs.).
Chinese Office Action dated Jul. 2, 2019, corresponding to Chinese Application No. 2015-80058757.9, (9 pages).
China Office Action from corresponding China Application No. 201710269050.3, China Office action dated Oct. 12, 2019 (9 pgs.).
English translation of China Office Action from corresponding China Application No. 201710269050.3, China Office action dated Oct. 12, 2019 (8 pgs.).

* cited by examiner

ADHESIVE FILM, OPTICAL MEMBER COMPRISING THE SAME AND OPTICAL DISPLAY COMPRISING THE SAME

CROSS-REFERENCE TO RELATED APPLICATIONS

This application claims priority to and the benefit of Korean Patent Application No. 10-2016-0049266, filed on Apr. 22, 2016 in the Korean Intellectual Property Office, and Korean Patent Application No. 10-2016-0170837, filed on Dec. 14, 2016 in the Korean Intellectual Property Office, the entire disclosure of each of which is incorporated herein by reference.

BACKGROUND

1. Field

Aspects of embodiments of the present invention relate to an adhesive film, an optical member including the same, and an optical display including the same.

2. Description of the Related Art

An optical display includes display elements including a window film, a conductive film, an organic light emitting diode, and the like. In the optical display, various display elements are attached to each other via optically clear adhesives (OCAs). Recently, a flexible optical display has been developed. To this end, an adhesive film is required to have good foldability while securing good reliability by preventing delamination or bubble generation under temperature variation or thermal impact conditions of high temperature, room temperature, and low temperature.

Such an adhesive film is used in an optical display and is required to have high peel strength not only at room temperature but also at high temperature. However, even when the adhesive film exhibits high peel strength at room temperature, the adhesive film generally suffers from deterioration in peel strength at high temperature. Moreover, an adhesive film exhibiting a large difference in peel strength or modulus between high temperature and room temperature can deteriorate reliability of the optical display.

The background technique of the present invention is disclosed in Korean Patent Publication No. 2007-0055363 A.

SUMMARY

According to an aspect of the present invention, an adhesive film is formed of a monomer mixture including a hydroxyl group-containing (meth)acrylate and an alkyl group-containing (meth)acrylate, and has a bubble generation area ratio of 0%, as measured on a specimen (length× width: 13 cm×3 cm) by repeating the following cycle 10 times, in which the specimen is prepared by sequentially stacking a polyethylene terephthalate (PET) film (thickness: 50 µm), the adhesive film (thickness: 100 µm) and a polyethylene terephthalate film (thickness: 100 µm) to have a three-layer structure, and bent towards the PET film (thickness: 50 µm) such that the specimen is placed between frames having a gap of about 1 cm therebetween and the length of the specimen is halved and the cycle is sequentially accomplished for 24 hours, where the cycle is defined by gradually increasing a temperature from 25° C. to 60° C. for 2 hours while maintaining 93% relative humidity (RH) →leaving the specimen under constant conditions of 60° C. and 93% RH for 3.5 hours→gradually decreasing the temperature to 25° C. for 2 hours while maintaining 93% RH→gradually increasing the temperature from 25° C. to 60° C. for 2 hours while maintaining 93% RH→leaving the specimen under constant conditions of 60° C. and 93% RH for 3.5 hours→gradually decreasing the temperature to 25° C. for 2 hours while maintaining 93% RH→leaving the specimen under constant conditions of 25° C. and 93% RH for 2 hours→gradually decreasing the temperature to −10° C. for 0.5 hours→leaving the specimen at constant condition of −10° C. for 3.5 hours→gradually increasing the temperature to 25° C. for 1 hour while maintaining 93% RH→leaving the specimen under constant conditions of 25° C. and 93% RH for 2 hours.

According to another aspect of the present invention, an optical member includes an optical film and the adhesive film formed on at least one surface of the optical film.

According to another aspect of the present invention, an optical display includes the adhesive film.

DETAILED DESCRIPTION

Figure 1:
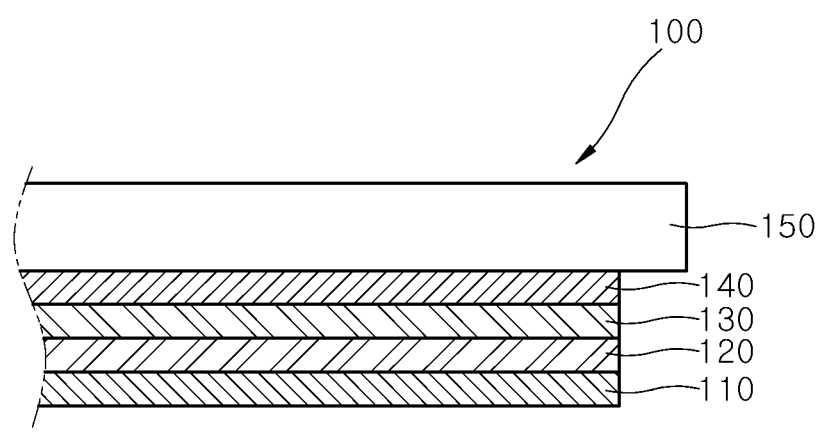
FIG. 1 is a sectional view of an optical display according to an embodiment of the present invention.

Herein, some embodiments of the present invention will be described in further detail with reference to the accompanying drawings to allow those skilled in the art to practice the present invention. It should be understood that the present invention may be embodied in different ways and is not limited to the following embodiments. In the drawings, portions irrelevant to the description may be omitted for clarity. Like components are denoted by like reference numerals throughout the specification.

As used herein, spatially relative terms such as "upper" and "lower" are defined with reference to the accompanying drawings. Thus, it is to be understood that "upper" can be used interchangeably with "lower." It is to be understood that when a layer is referred to as being "on" another layer, it may be directly formed on the other layer, or one or more intervening layers may also be present. Thus, it is to be understood that when a layer is referred to as being "directly on" another layer, no intervening layer is interposed therebetween.

As used herein, the term "(meth)acryl" refers to acryl and/or methacryl.

Herein, the term "copolymer" may include an oligomer, a polymer, or a resin.

Herein, the "average particle diameter" of organic nanoparticles refers to a particle diameter thereof, as measured in a water-based or organic solvent using a Zetasizer nano-ZS (Malvern Co., Ltd.) and represented by a Z-average value.

Herein, "modulus" means storage modulus (G').

Herein, an adhesive film according to an embodiment of the present invention will be described.

An adhesive film according to an embodiment of the present invention (herein, "adhesive film") is formed of a monomer mixture including a hydroxyl group-containing (meth)acrylate and an alkyl group-containing (meth)acrylate, and has a bubble generation area ratio of 0%, as measured on a specimen (length×width: 13 cm×3 cm) by repeating the following cycle 10 times, in which the specimen is prepared by sequentially stacking a polyethylene terephtalate film (thickness: 50 µm), the adhesive film (thickness: 100 µm) and a polyethylene terephthalate film (thickness: 100 µm) to have a three-layer structure, and is bent towards the PET film (thickness: 50 µm) such that the specimen is placed between frames having a gap of about 1 cm therebetween and the length of the specimen is halved. Within this range, the adhesive film can extend life span of a flexible display under temperature variation conditions of high temperature, room temperature, and low temperature when used in the flexible display, where the cycle is defined by gradually increasing a temperature from 25° C. to 60° C. for 2 hours while maintaining 93% relative humidity (RH)→leaving the specimen under constant conditions of 60° C. and 93% RH for 3.5 hours→gradually decreasing the temperature to 25° C. for 2 hours while maintaining 93% RH→gradually increasing the temperature from 25° C. to 60° C. for 2 hours while maintaining 93% RH→leaving the specimen under constant conditions of 60° C. and 93% RH for 3.5 hours→gradually decreasing the temperature to 25° C. for 2 hours while maintaining 93% RH→leaving the specimen under constant conditions of 25° C. and 93% RH for 2 hours→gradually decreasing the temperature to −10° C. for 0.5 hours→leaving the specimen at constant condition of −10° C. for 3.5 hours→gradually increasing the temperature to 25° C. for 1 hour while maintaining 93% RH→leaving the specimen under constant conditions of 25° C. and 93% RH for 2 hours.

In addition, the adhesive film according to this embodiment may have a bubble generation area ratio of 0%, as measured by repeating the following cycle 30 times. Within this range, the adhesive film can extend life span of a flexible display under thermal impact conditions when used in the flexible display. The cycle is defined as leaving the specimen at constant condition of −40° C. for 2 hours→leaving the specimen at constant condition of 85° C. for 2 hours.

Furthermore, not only does the adhesive film according to this embodiment have high peel strength at room temperature, the adhesive film according to this embodiment can also reduce a peel strength reduction ratio of peel strength at high temperature to peel strength at room temperature, thereby improving durability and reliability without delamination or slight lifting. The adhesive film according to this embodiment may have a peel strength reduction ratio of about 60% or less, and, in an embodiment, about 0% to about 60%, for example, about 0%, 5%, 10%, 15%, 20%, 25%, 30%, 35%, 40%, 45%, 50%, 55%, or 60%, as represented by Equation 1. Within this range, the adhesive film can exhibit good reliability and durability, and can be used in a flexible display.

Peel strength reduction ratio=$|B-A|/A \times 100$, <Equation 1> where A is peel strength of the adhesive film at 25° C. (unit: gf/in) and B is peel strength of the adhesive film at 60° C. (unit: gf/in).

Furthermore, the adhesive film according to this embodiment may have a peel strength difference of about 1,200 gf/in or less, and, in an embodiment, about 50 gf/in to about 1,000 gf/in, for example, about 0 gf/in, 50 gf/in, 100 gf/in, 150 gf/in, 200 gf/in, 250 gf/in, 300 gf/in, 350 gf/in, 400 gf/in, 450 gf/in, 500 gf/in, 550 gf/in, 600 gf/in, 650 gf/in, 700 gf/in, 750 gf/in, 800 gf/in, 850 gf/in, 900 gf/in, 950 gf/in, 1,000 gf/in, 1,050 gf/in, 1,100 gf/in, 1,150 gf/in, or 1,200 gf/in, as represented by Equation 2. Within this range, the adhesive film can exhibit good reliability and durability, and can be used in a flexible display.

Peel strength difference=$|B-A|$, Equation 2 where A and B are the same as defined in Equation 1.

In Equations 1 and 2, B may be less than or equal to A (B≤A) and the term "peel strength" as used herein means T-peel strength.

According to this embodiment, the adhesive film may have a peel strength of about 700 gf/in or more, and, in an embodiment, about 900 gf/in or more, and, in an embodiment, about 900 gf/in to about 3000 gf/in, for example, about 700 gf/in, 800 gf/in, 900 gf/in, 1,000 gf/in, 1,100 gf/in, 1,200 gf/in, 1,300 gf/in, 1,400 gf/in, 1,500 gf/in, 1,600 gf/in, 1,700 gf/in, 1,800 gf/in, 1,900 gf/in, 2,000 gf/in, 2,100 gf/in, 2,200 gf/in, 2,300 gf/in, 2,400 gf/in, 2,500 gf/in, 2,600 gf/in, 2,700 gf/in, 2,800 gf/in, 2,900 gf/in, or 3,000 gf/in, as defined by A in Equations 1 and 2. The adhesive film may have a peel strength of about 500 gf/in or more, and, in an embodiment, about 500 gf/in to about 3,000 gf/in, for example, about 500 gf/in, 600 gf/in, 700 gf/in, 800 gf/in, 900 gf/in, 1,000 gf/in, 1,100 gf/in, 1,200 gf/in, 1,300 gf/in, 1,400 gf/in, 1,500 gf/in, 1,600 gf/in, 1,700 gf/in, 1,800 gf/in, 1,900 gf/in, 2,000 gf/in, 2,100 gf/in, 2,200 gf/in, 2,300 gf/in, 2,400 gf/in, 2,500 gf/in, 2,600 gf/in, 2,700 gf/in, 2,800 gf/in, 2,900 gf/in, or 3,000 gf/in, as defined by B in Equations 1 and 2. Within these ranges of peel strength, the adhesive film can exhibit good durability.

The adhesive film may have a ratio of modulus at 80° C. to modulus at −20° C. (modulus at 80° C.:modulus at −20° C.) of about 1:1 to about 1:10, and, in an embodiment, about 1:1 to about 1:8, and, in an embodiment, about 1:1 to about 1:6, for example, about 1:1, about 1:2, about 1:3, about 1:4, about 1:5, about 1:6, about 1:7, about 1:8, about 1:9, or about 1:10. Within this range, the adhesive film can exhibit good durability and reliability due to a small difference in modulus between low temperature and high temperature, can prevent or substantially prevent deterioration in adhesion between adherends in a wide temperature range (−20° C. to 80° C.), and can be used in a flexible optical member. Particularly, these effects of the adhesive film can be further improved at a modulus ratio of 1:1 to 1:6.

The adhesive film may have a modulus at 80° C. of about 10 kPa to about 500 kPa, and, in an embodiment, about 12 kPa to about 300 kPa, for example, about 10 kPa, 20 kPa, 30 kPa, 40 kPa, 50 kPa, 60 kPa, 70 kPa, 80 kPa, 90 kPa, 100 kPa, 110 kPa, 120 kPa, 130 kPa, 140 kPa, 150 kPa, 160 kPa, 170 kPa, 180 kPa, 190 kPa, 200 kPa, 210 kPa, 220 kPa, 230 kPa, 240 kPa, 250 kPa, 260 kPa, 270 kPa, 280 kPa, 290 kPa, 300 kPa, 310 kPa, 320 kPa, 330 kPa, 340 kPa, 350 kPa, 360 kPa, 370 kPa, 380 kPa, 390 kPa, 400 kPa, 410 kPa, 420 kPa, 430 kPa, 440 kPa, 450 kPa, 460 kPa, 470 kPa, 480 kPa, 490 kPa, or 500 kPa. Within this range, the adhesive film can exhibit improved reliability at high temperature. The adhesive film may have a modulus at 25° C. of about 15 kPa to about 500 kPa, and, in an embodiment, about 20 kPa to about 300 kPa, for example, about 15 kPa, 20 kPa, 30 kPa, 40 kPa, 50 kPa, 60 kPa, 70 kPa, 80 kPa, 90 kPa, 100 kPa, 110 kPa, 120 kPa, 130 kPa, 140 kPa, 150 kPa, 160 kPa, 170 kPa, 180 kPa, 190 kPa, 200 kPa, 210 kPa, 220 kPa, 230 kPa, 240 kPa, 250 kPa, 260 kPa, 270 kPa, 280 kPa, 290 kPa, 300 kPa, 310 kPa, 320 kPa, 330 kPa, 340 kPa, 350 kPa, 360 kPa, 370 kPa, 380 kPa, 390 kPa, 400 kPa, 410 kPa, 420 kPa, 430 kPa, 440 kPa, 450 kPa, 460 kPa, 470 kPa, 480 kPa, 490 kPa, or 500 kPa. Within this range, the adhesive film can exhibit viscoelasticity at room temperature and has good restoration force while exhibiting good foldability. The adhesive film may have a modulus at −20° C. of about 20 kPa to about 500 kPa, and, in an embodiment, about 30 kPa to about 500 kPa, for example, about 20 kPa, 30 kPa, 40 kPa, 50 kPa, 60 kPa, 70 kPa, 80 kPa, 90 kPa, 100 kPa, 110 kPa, 120 kPa, 130 kPa, 140 kPa, 150 kPa, 160 kPa, 170 kPa, 180 kPa, 190 kPa, 200 kPa, 210 kPa, 220 kPa, 230 kPa, 240 kPa, 250 kPa, 260 kPa, 270 kPa, 280 kPa, 290 kPa, 300 kPa, 310 kPa, 320 kPa, 330 kPa, 340 kPa, 350 kPa, 360 kPa, 370 kPa, 380 kPa, 390 kPa, 400 kPa, 410 kPa, 420 kPa, 430 kPa, 440 kPa, 450 kPa, 460 kPa, 470 kPa, 480 kPa, 490 kPa, or 500 kPa. Within this range, the adhesive film can exhibit viscoelastic properties at low temperature and has good restoration force.

In an embodiment, the adhesive film may have a glass transition temperature (Tg) of about $-100°$ C. to about $-10°$ C., and, in an embodiment, about $-70°$ C. to about $-35°$ C., for example, about $-100°$ C., $-90°$ C., $-80°$ C., $-70°$ C., $-60°$ C., $-50°$ C., $-40°$ C., $-30°$ C., $-20°$ C., or $-10°$ C. Within this range, the adhesive film can have improved folding reliability at low temperature to high temperature.

The adhesive film may have a creep at 25° C. of about 10 μm to about 400 μm, and, in an embodiment, about 30 μm to about 300 μm. Within this range, the adhesive film can exhibit good properties in terms of foldability, adhesive strength, and reliability (small bubble generation area ratio) under severe conditions.

The adhesive film may have a dielectric constant of about 1.8 to about 3.0 at 1 MHz. Within this range, the adhesive film allows a display apparatus to be driven without failure when stacked on a transparent conductive film in a touch panel.

The adhesive film may have a haze of about 2% or less, and, in an embodiment, about 0.1% to about 1%, and a total luminous transmittance of about 90% or more, and, in an embodiment, about 95% to about 99%, in the visible range (for example: in a wavelength range of 380 nm to 780 nm). Within this range, the adhesive film can exhibit good optical transparency to be used in an optical display. The adhesive film may have a thickness of about 10 μm to about 300 μm, and, in an embodiment, about 12 μm to about 175 μm. Within this thickness range, the adhesive film can be used in an optical display.

The adhesive film according to the embodiment may be formed by photo-curing of an adhesive composition. The adhesive composition may include a monomer mixture for a (meth)acrylic copolymer having a hydroxyl group; an initiator; and at least one of a macro-monomer and organic nanoparticles. In the adhesive composition, the monomer mixture may be used as a non-polymerized monomer mixture or may be used as a partially polymerized monomer mixture.

The monomer mixture can form the (meth)acrylic copolymer having a hydroxyl group. The (meth)acrylic copolymer having a hydroxyl group can form a matrix of the adhesive film and exhibit adhesive properties. In an embodiment, the (meth)acrylic copolymer having a hydroxyl group may have a glass transition temperature of about $-100°$ C. to about 10° C., and, in an embodiment, about $-70°$ C. to about 0° C., for example, about $-100°$ C., $-90°$ C., $-80°$ C., $-70°$ C., $-60°$ C., $-50°$ C., $-40°$ C., $-30°$ C., $-20°$ C., $-10°$ C., 0° C., or 10° C. Within this range, the adhesive film can exhibit good adhesion and reliability in a wide temperature range.

The (meth)acrylic copolymer having a hydroxyl group may have a refractive index of about 1.35 to about 1.70, and, in an embodiment, about 1.40 to about 1.60, for example, about 1.35, 1.40, 1.45, 1.50, 1.55, 1.60, 1.65, or 1.70. Within this range, the adhesive film can maintain transparency when stacked on other optical films. The monomer mixture may be composed of a hydroxyl group-containing (meth)acrylate and an alkyl group-containing (meth)acrylate.

The hydroxyl group-containing (meth)acrylate can provide adhesive strength to the adhesive film. The hydroxyl group-containing (meth)acrylate may be a (meth)acrylate having at least one hydroxyl group. For example, the hydroxyl group-containing (meth)acrylate may include at least one selected from among 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, 6-hydroxyhexyl (meth)acrylate, 1,4-cyclohexanedimethanol mono(meth)acrylate, 1-chloro-2-hydroxypropyl (meth)acrylate, diethylene glycol mono(meth)acrylate, 1,6-hexanediol mono(meth)acrylate, pentaerythritol tri(meth)acrylate, dipentaerythritol penta(meth)acrylate, neopentylglycol mono(meth)acrylate, trimethylolpropane di(meth)acrylate, trimethylolethane di(meth)acrylate, 2-hydroxy-3-phenyloxypropyl (meth)acrylate, 4-hydroxycyclopentyl (meth)acrylate, 4-hydroxycyclohexyl (meth)acrylate, and cyclohexanedimethanol mono(meth)acrylate. The hydroxyl group-containing (meth)acrylate may be present in an amount of about 5 wt % to about 40 wt %, and, in an embodiment, about 8 wt % to about 30 wt %, and, in an embodiment, about 10 wt % to about 30 wt %, for example, about 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, or 40 wt %, based on the total amount of the hydroxyl group-containing (meth)acrylate and the alkyl group-containing (meth)acrylate. Within this range, the adhesive film can exhibit further improved adhesion and reliability.

The alkyl group-containing (meth)acrylate can form a matrix of the adhesive film. The alkyl group-containing (meth)acrylate may include an unsubstituted $C_1$ to $C_{20}$ linear or branched alkyl (meth)acrylic acid ester. For example, the alkyl group-containing (meth)acrylate may include at least one selected from among methyl (meth)acrylate, ethyl (meth)acrylate, propyl (meth)acrylate, n-butyl (meth)acrylate, t-butyl (meth)acrylate, iso-butyl (meth)acrylate, pentyl (meth)acrylate, hexyl (meth)acrylate, heptyl (meth)acrylate, ethylhexyl (meth)acrylate, octyl (meth)acrylate, isooctyl (meth)acrylate, nonyl (meth)acrylate, decyl (meth)acrylate, lauryl (meth)acrylate, and isobornyl (meth)acrylate. The alkyl group-containing (meth)acrylate may be present in an amount of about 60 wt % to about 95 wt %, and, in an embodiment, about 65 wt % to about 92 wt %, and, in an embodiment, about 68 wt % to about 90 wt %, and, in an embodiment, about 70 wt % to about 90 wt %, for example, about 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, 90 wt %, 91 wt %, 92 wt %, 93 wt %, 94 wt %, or 95 wt %, based on the total amount of the hydroxyl group-containing (meth)acrylate and the alkyl group-containing (meth)acrylate. Within this range, the adhesive film can exhibit further improved adhesion and reliability.

The monomer mixture may further include a copolymerizable monomer. The copolymerizable monomer may provide additional effects to the (meth)acrylic copolymer, the adhesive composition, or the adhesive film. In an embodiment, the copolymerizable monomer is a different monomer than the hydroxyl group-containing (meth)acrylate and the alkyl group-containing (meth)acrylate, and may include at least one of an ethylene oxide-containing monomer, a propylene oxide-containing monomer, an amine group-containing monomer, an alkoxy group-containing monomer, a phosphate group-containing monomer, a sulfonic acid group-containing monomer, a phenyl group-containing monomer, a silane group-containing monomer, a carboxylic acid group-containing monomer, and an amide group-containing (meth)acrylate.

The ethylene oxide-containing monomer may include at least one (meth)acrylate monomer containing an ethylene oxide group (—CH$_2$CH$_2$O—). For example, the ethylene oxide-containing monomer may include any of polyethylene oxide alkyl ether (meth)acrylates, such as polyethylene oxide monomethyl ether (meth)acrylate, polyethylene oxide monoethyl ether (meth)acrylate, polyethylene oxide monopropyl ether (meth)acrylate, polyethylene oxide monobutyl ether (meth)acrylate, polyethylene oxide monopentyl ether (meth)acrylate, polyethylene oxide dimethyl ether (meth)acrylate, polyethylene oxide diethyl ether (meth)acrylate, polyethylene oxide monoisopropyl ether (meth)acrylate, polyethylene oxide monoisobutyl ether (meth)acrylate, and polyethylene oxide mono-tert-butyl ether (meth)acrylate, without being limited thereto.

The propylene oxide-containing monomer may include a polypropylene oxide alkyl ether (meth)acrylate, such as any of polypropylene oxide monomethyl ether (meth)acrylate, polypropylene oxide monoethyl ether (meth)acrylate, polypropylene oxide monopropyl ether (meth)acrylate, polypropylene oxide monobutyl ether (meth)acrylate, polypropylene oxide monopentyl ether (meth)acrylate, polypropylene oxide dimethyl ether (meth)acrylate, polypropylene oxide diethyl ether (meth)acrylate, polypropylene oxide monoisopropyl ether (meth)acrylate, polypropylene oxide monoisobutyl ether (meth)acrylate, and polypropylene oxide mono-tert-butyl ether (meth)acrylate, without being limited thereto.

The amine group-containing monomer may include any of amine group-containing (meth)acrylic monomers, such as monomethylaminoethyl (meth)acrylate, monoethylaminoethyl (meth)acrylate, monomethylaminopropyl (meth)acrylate, monoethylaminopropyl (meth)acrylate, dimethylaminoethyl (meth)acrylate, diethylaminoethyl (meth)acrylate, N-tert-butylaminoethyl (meth)acrylate, and (meth)acryloxyethyltrimethyl ammonium chloride (meth)acrylate, without being limited thereto.

The alkoxy group-containing monomer may include any of 2-methoxy ethyl (meth)acrylate, 2-methoxypropyl (meth)acrylate, 2-ethoxypropyl (meth)acrylate, 2-butoxypropyl (meth)acrylate, 2-methoxypentyl (meth)acrylate, 2-ethoxypentyl (meth)acrylate, 2-butoxyhexyl (meth)acrylate, 3-methoxypentyl (meth)acrylate, 3-ethoxypentyl (meth)acrylate, and 3-butoxyhexyl (meth)acrylate, without being limited thereto.

The phosphate group-containing monomer may include any of phosphate group-containing acrylic monomers, such as 2-methacryloyloxyethyldiphenylphosphate (meth)acrylate, trimethacryloyloxyethylphosphate (meth)acrylate, and triacryloyloxyethylphosphate (meth)acrylate, without being limited thereto.

The sulfonic acid group-containing monomer may include any of sulfonic acid group-containing acrylic monomers, such as sodium sulfopropyl (meth)acrylate, sodium 2-sulfoethyl (meth)acrylate, and sodium 2-acrylamido-2-methylpropane sulfonate, without being limited thereto.

The phenyl group-containing monomer may include any of phenyl group-containing acrylic vinyl monomers, such as p-tert-butylphenyl (meth)acrylate, o-biphenyl (meth)acrylate, and phenoxyethyl (meth)acrylate, without being limited thereto.

The silane group-containing monomer may include any of silane group-containing vinyl monomers, such as 2-acetoacetoxyethyl (meth)acrylate, vinyltrimethoxysilane, vinyltriethoxysilane, vinyl tris(2-methoxyethyl)silane, vinyltriacetoxysilane, and (meth)acryloyloxypropyltrimethoxysilane, without being limited thereto.

The carboxylic acid group-containing monomer may include any of (meth)acrylic acid, 2-carboxyethyl (meth)acrylate, 3-carboxypropyl (meth)acrylate, 4-carboxybutyl (meth)acrylate, itaconic acid, crotonic acid, maleic acid, fumaric acid, and maleic anhydride, without being limited thereto.

The amide group-containing monomer may include any of (meth)acrylamide, N-methyl (meth)acrylamide, N-methylol (meth)acrylamide, N-methoxymethyl (meth)acrylamide, N,N-methylene bis(meth)acrylamide, N-hydroxyethyl (meth)acrylamide, and N,N-diethyl (meth)acrylamide, without being limited thereto.

The copolymerizable monomer may be present in an amount of about 15 parts by weight or less, and, in an embodiment, about 10 parts by weight or less, and, in an embodiment, about 0.05 parts by weight to about 8 parts by weight, relative to about 100 parts by weight of the hydroxyl group-containing (meth)acrylate and the alkyl group-containing (meth)acrylate. Within this range, the adhesive composition can further improve adhesive strength and recovery of the adhesive film. The carboxylic acid group-containing monomer may be present in an amount of about 5 parts by weight or less, and, in an embodiment, about 3 parts by weight or less, and, in an embodiment, about 1 part by weight or less, relative to about 100 parts by weight of the hydroxyl group-containing (meth)acrylate and the alkyl group-containing (meth)acrylate. Within this range, the adhesive composition can further improve adhesive strength and durability of the adhesive film.

The initiator may be used to form a (meth)acrylic copolymer by curing (partially polymerizing) the monomer mixture, or to cure a viscous liquid into a film. The initiator may include at least one of a photopolymerization initiator and a heat polymerization initiator.

The photopolymerization initiator may be any initiator so long as the initiator can induce polymerization of a radical polymerizable compound during curing through light irradiation. For example, the photopolymerization initiator may include any of benzoin, acetophenone, hydroxy ketone, amino ketone, phosphine oxide photoinitiators, and the like. In an embodiment, the photopolymerization initiator may include any of benzoin, benzoin methyl ether, benzoin ethyl ether, benzoin isopropyl ether, benzoin n-butyl ether, benzoin isobutyl ether, acetophenone compounds such as 2,2-dimethoxy-2-phenylacetophenone, 2,2'-diethoxyacetophenone, 2,2'-dibutoxyacetophenone, 2-hydroxy-2-methylpropiophenone, p-t-butyl trichloroacetophenone, p-t-butyl dichloroacetophenone, 4-chloroacetophenone, 2,2'-dichloro-4-phenoxyacetophenone, dimethylamino acetophenone, 2,2-dimethoxy-2-phenylacetophenone, and 2,2-diethoxy-2-phenylacetophenone, 2-hydroxy-2-methyl-1-phenylpropan-1-one, 2-benzyl-2-dimethyl amino-1-(4-morpholinophenyl)-butane-1-one, 1-hydroxycyclohexyl-phenylketone, 2-methyl-1-[4-(methylthio)phenyl]-2-morpholino-propan-1-one, 4-(2-hydroxyethoxy)phenyl-2-(hydroxy-2-propyl)ketone, benzophenone, p-phenylbenzophenone, 4,4'-diethylaminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethylketal, acetophenone dimethylketal, p-dimethylamino benzoic acid ester, oligo[2-hydroxy-2-methyl-1-[4-(1-methylvinyl)phenyl]propanone], and 2,4,6-trimethylbenzoyl-diphenyl-phosphine oxide, without being limited thereto. These photopolymerization initiators may be used alone or in combination thereof.

The heat polymerization initiator may be any typical initiator, for example, azo, peroxide and redox compounds, so long as the initiator can realize the above properties. Examples of the azo compound may include 2,2-azobis(2-methylbutyronitrile), 2,2-trilazobis(isobutyronitrile), 2,2-trilazobis(2,4-dimethylvaleronitrile), 2,2-nitazobis-2-hydroxymethylpropionitrile, dimethyl-2,2-methylazobis(2-methylpropionate), and 2,2-pioazobis(4-methoxy-2,4-dimethylvaleronitrile), without being limited thereto. Examples of the peroxide compound may include: inorganic peroxides such as potassium perchlorate, ammonium persulfate, and hydrogen peroxide; and organic peroxides such as diacetylperoxide, peroxy dicarbonate, peroxy ester, tetramethylbutyl peroxy neodecanoate, bis(4-butylcyclohexyl)peroxydicarbonate, di(2-ethylhexyl)peroxy carbonate, butylperoxy peroxyneodecanoate, dipropyl peroxydicarbonate, diisopropyl peroxydicarbonate, diethoxyethyl peroxydicarbonate, diethoxyhexyl peroxydicarbonate, hexyl peroxydicarbonate, dimethoxybutyl peroxydicarbonate, bis (3-methoxy-3-methoxybutyl) peroxydicarbonate, dibutyl peroxydicarbonate, dicetyl peroxydicarbonate, dimyristyl peroxydicarbonate, 1,1,3,3-tetramethylbutyl peroxypivalate, hexyl peroxypivalate, butyl peroxypivalate, trimethylhexanoyl peroxide, dimethyl hydroxybutyl peroxyneodecanoate, amyl peroxyneodecanoate, butyl peroxyneodecanoate, t-butylperoxy neoheptanoate, amyl peroxypivalate, t-butyl peroxypivalate, t-amyl peroxy-2-ethylhexanoate, lauroyl peroxide, dilauroyl peroxide, didecanoyl peroxide, benzoyl peroxide, and dibenzoyl peroxide, without being limited thereto. Examples of the redox compound may include mixtures of a peroxide compound and a reductant, without being limited thereto. These azo, peroxide and redox compounds may be used alone or in combination thereof.

The initiator may be present in an amount of about 0.0001 parts by weight to about 5 parts by weight, and, in an embodiment, about 0.001 parts by weight to about 3 parts by weight, and, in an embodiment, about 0.001 parts by weight to about 1 part by weight, relative to 100 parts by weight of the hydroxyl group-containing (meth)acrylate and the alkyl group-containing (meth)acrylate which form the (meth) acrylic copolymer. Within this range, the initiator allows complete curing of the adhesive composition, can prevent or substantially prevent deterioration in transmittance of the adhesive film due to residual initiator, can reduce bubble generation, and can exhibit good reactivity.

The macro-monomer can be polymerized with the monomer mixture to form the (meth)acrylic copolymer having a hydroxyl group, thereby improving strength of the adhesive film. The macro-monomer can improve peel strength of the adhesive film even when the adhesive film has a thin thickness.

The macro-monomer has a functional group that can be cured by active energy rays, and can be polymerized with the hydroxyl group-containing (meth)acrylate and the alkyl group-containing (meth)acrylate. The macro-monomer can be represented by Formula 1:

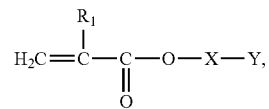

<Formula 1> where $R_1$ is hydrogen or a methyl group, X is a single bond or a bivalent coupling group, and Y is a polymer chain obtained by one or two selected from among methyl (meth)acrylate, ethyl (meth)acrylate, n-butyl (meth)acrylate, iso-butyl (meth)acrylate, t-butyl (meth)acrylate, styrene, and (meth)acrylonitrile.

The macro-monomer may have a number average molecular weight of about 2,000 to about 20,000, and, in an embodiment, about 2,000 to about 10,000, and, in an embodiment, about 4,000 to about 8,000, for example, about 2,000, 3,000, 4,000, 5,000, 6,000, 7,000, 8,000, 9,000, 10,000, 11,000, 12,000, 13,000, 14,000, 15,000, 16,000, 17,000, 18,000, 19,000, or 20,000. Within this range, the adhesive composition can exhibit sufficient adhesive strength and good thermal resistance while suppressing deterioration in workability due to increase in viscosity of the adhesive composition. The macro-monomer may have a glass transition temperature of about 40° C. to about 150° C., and, in an embodiment, about 60° C. to about 140° C., and, in an embodiment, about 80° C. to about 130° C., for example, about 40° C., 50° C., 60° C., 70° C., 80° C., 90° C., 100° C., 110° C., 120° C., 130° C., 140° C., or 150° C. Within this range, the adhesive film can exhibit sufficient cohesion and can suppress deterioration in tack or adhesion.

The bivalent coupling group may be a $C_1$ to $C_{10}$ alkylene group, a $C_7$ to $C_{13}$ arylalkylene group, a $C_6$ to $C_{12}$ arylene group, $-NR^2-$ ($R^2$ being hydrogen or a $C_1$ to $C_5$ alkyl group), or a group derived from COO—, —O—, —S—, $-SO_2NH-$, $-NHSO_2-$, —NHCOO—, —OCONH, or a hetero ring.

In addition, the bivalent coupling group may be represented by Formulas 1a to 1d:

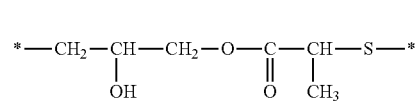

<Formula 1a>

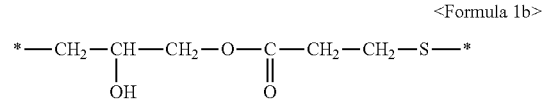

<Formula 1b>

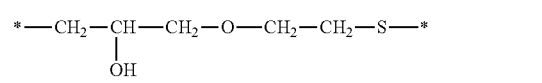

<Formula 1c>

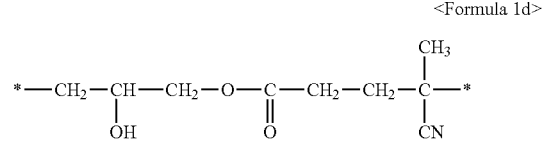

<Formula 1d> where * is a connection site of an element.

The macro-monomer may be obtained from commercially available products. For example, the macro-monomer may include any of a macro-monomer in which a segment corresponding to Y is methyl methacrylate, a macro-monomer in which a segment corresponding to Y is styrene, a macro-monomer in which a segment corresponding to Y is styrene/acrylonitrile, and a macro-monomer in which a segment corresponding to Y is butyl acrylate, all of which have a methacryloyl group at a terminal thereof.

The macro-monomer may be present in an amount of about 20 parts by weight or less, and, in an embodiment, about 0.1 parts by weight to about 20 parts by weight, about 0.1 parts by weight to about 10 parts by weight, or about 0.5 parts by weight to about 5 parts by weight, relative to 100 parts by weight of the hydroxyl group-containing (meth) acrylate and the alkyl group-containing (meth)acrylate. Within this range, the adhesive film can have property balance between viscoelasticity, modulus and restoration force, and can prevent or substantially prevent increase in haze.

The organic nanoparticles can increase the modulus of the adhesive film at high temperature and can further improve reliability of the adhesive film at high temperature by preventing or substantially preventing delamination, slight lifting and/or bubble generation at high temperature. The organic nanoparticles have a high glass transition temperature, thereby improving the modulus of the adhesive film at high temperature.

The organic nanoparticles may have an average particle diameter of about 10 nm to about 400 nm, and, in an embodiment, about 10 nm to about 300 nm, and, in an embodiment, about 30 nm to about 280 nm, and, in an embodiment, about 50 nm to about 280 nm, for example, about 10 nm, 20 nm, 30 nm, 40 nm, 50 nm, 60 nm, 70 nm, 80 nm, 90 nm, 100 nm, 110 nm, 120 nm, 130 nm, 140 nm, 150 nm, 160 nm, 170 nm, 180 nm, 190 nm, 200 nm, 210 nm, 220 nm, 230 nm, 240 nm, 250 nm, 260 nm, 270 nm, 280 nm, 290 nm, 300 nm, 310 nm, 320 nm, 330 nm, 340 nm, 350 nm, 360 nm, 370 nm, 380 nm, 390 nm, or 400 nm. Within this range of average particle diameter, the organic nanoparticles do not affect foldability of the adhesive film and can secure good transparency of the adhesive film by securing a total luminous transmittance of about 90% or more in the visible range.

A difference in refractive index between the organic nanoparticles and the (meth)acrylic copolymer having a hydroxyl group may be about 0.1 or less, and, in an embodiment, about 0 to about 0.05, and, in an embodiment, about 0 to about 0.02, for example, about 0, 0.01, 0.02, 0.03, 0.04, 0.05, 0.06, 0.07, 0.08, 0.09, or 0.1. Within this range, the adhesive film can exhibit good transparency. The organic nanoparticles may have a refractive index of about 1.35 to about 1.70, and, in an embodiment, about 1.40 to about 1.60, for example, about 1.35, 1.4, 1.45, 1.5, 1.55, 1.6, 1.65, or 1.7. Within this range, the adhesive film can exhibit good transparency.

The organic nanoparticles may have a core-shell structure or a simple structure, such as bead type nanoparticles, without being limited thereto. In one embodiment, the organic nanoparticles may have a core-shell structure, in which the core and the shell satisfy Equation 3. That is, the organic nanoparticles may include nanoparticles in which the core and the shell are formed of organic materials. With the organic nanoparticles having the core-shell structure, the adhesive film can exhibit good foldability and effective balance between elasticity and flexibility.

$$Tg(c) < Tg(s), \qquad \text{<Equation 3>}$$

where Tg(c) is the glass transition temperature (unit: ° C.) of the core, and Tg(s) is the glass transition temperature (unit: ° C.) of the shell.

Herein, the term "shell" means an outermost layer of the organic nanoparticle. The core may be a spherical particle. In some embodiments, the core may include an additional layer surrounding the spherical particle so long as the core has a glass transition temperature satisfying the above equation.

The core may have a glass transition temperature of about −150° C. to about 10° C., and, in an embodiment, about −150° C. to about −5° C., and, in an embodiment, about −150° C. to about −20° C., for example, about −150° C., −140° C., −130° C., −120° C., −110° C., −100° C., −90° C., −80° C., −70° C., −60° C., −50° C., −40° C., −30° C., −20° C., −10° C., 0° C., or 10° C. Within this range, the adhesive film can have good viscoelasticity at low temperature and/or at room temperature. The core may include at least one of a poly(alkyl (meth)acrylate), a polysiloxane, and a polybutadiene, each having a glass transition temperature within this range.

The poly(alkyl (meth)acrylate) may include at least one of poly(methyl acrylate), poly(ethyl acrylate), poly(propyl acrylate), poly(butyl acrylate), poly(isopropyl acrylate), poly(hexyl acrylate), poly(hexyl methacrylate), poly(ethylhexyl acrylate), and poly(ethylhexyl methacrylate), without being limited thereto.

The polysiloxane may be, for example, an organosiloxane (co)polymer. The organosiloxane (co)polymer may be a non-cross-linked or cross-linked organosiloxane (co)polymer. The cross-linked organosiloxane (co)polymer may be used to secure impact resistance and colorability. In an embodiment, the cross-linked organosiloxane (co)polymer may include cross-linked dimethylsiloxane, methylphenylsiloxane, diphenylsiloxane, and mixtures thereof. With a copolymer of two or more organosiloxanes, the nanoparticles can have a refractive index of about 1.41 to about 1.50.

A cross-linked state of the organosiloxane (co)polymer can be determined based on the degree of dissolution in various organic solvents. As the degree of crosslinking of the organosiloxane (co)polymer intensifies, the degree of dissolution of the organosiloxane (co)polymer is reduced. A solvent for determination of the cross-linked state may include acetone, toluene, and the like. The organosiloxane (co)polymer may have a moiety which is not dissolved in acetone or toluene. The organosiloxane copolymer may include about 30% or more of insolubles in toluene.

The organosiloxane (co)polymer may further include an alkyl acrylate cross-linked polymer. The alkyl acrylate cross-linked polymer may include any of methyl acrylate, ethyl acrylate, n-butyl acrylate, 2-ethylhexyl acrylate, and the like. For example, the alkyl acrylate cross-linked polymer may be n-butyl acrylate or 2-ethylhexyl acrylate having a low glass transition temperature.

In an embodiment, the shell may have a glass transition temperature of about 15° C. to about 150° C., and, in an embodiment, about 35° C. to about 150° C., and, in an embodiment, about 50° C. to about 140° C. Within this range, the organic nanoparticles can exhibit good dispersion in the (meth)acrylic copolymer. The shell may include poly(alkyl methacrylate) having a glass transition temperature within this range. For example, the shell may include at least one of poly(methyl methacrylate) (PMMA), poly(ethyl methacrylate), poly(propyl methacrylate), poly(butyl methacrylate), poly(isopropyl methacrylate), poly(isobutyl methacrylate), and poly(cyclohexyl methacrylate), without being limited thereto.

In the organic nanoparticles, the core may be present in an amount of about 30 wt % to about 99 wt %, and, in an embodiment, about 40 wt % to 95 wt %, and, in an embodiment, about 50 wt % to about 90 wt %, for example, about 30 wt %, 35 wt %, 40 wt %, 45 wt %, 50 wt %, 55 wt %, 60 wt %, 65 wt %, 70 wt %, 75 wt %, 80 wt %, 85 wt %, 90 wt %, 95 wt %, or 99 wt %. Within this range, the adhesive film can exhibit good foldability in a wide temperature range. In the organic nanoparticles, the shell may be present in an amount of about 1 wt % to about 70 wt %, and, in an embodiment, about 5 wt % to about 60 wt %, and, in an embodiment, about 10 wt % to about 50 wt %, for example, about 1 wt %, 5 wt %, 10 wt %, 15 wt %, 20 wt %, 25 wt %, 30 wt %, 35 wt %, 40 wt %, 45 wt %, 50 wt %, 55 wt %, 60 wt %, 65 wt %, or 70 wt %. Within this range, the adhesive film can exhibit good foldability in a wide temperature range.

The organic nanoparticles may be present in an amount of about 0.1 parts by weight to about 20 parts by weight, and, in an embodiment, about 0.5 parts by weight to about 10 parts by weight, and, in an embodiment, about 0.5 parts by weight to about 8 parts by weight, for example, about 0.1 parts by weight, 0.5 parts by weight, 1 part by weight, 1.5 parts by weight, 2 parts by weight, 2.5 parts by weight, 3 parts by weight, 3.5 parts by weight, 4 parts by weight, 4.5 parts by weight, 5 parts by weight, 5.5 parts by weight, 6 parts by weight, 6.5 parts by weight, 7 parts by weight, 7.5 parts by weight, 8 parts by weight, 8.5 parts by weight, 9 parts by weight, 9.5 parts by weight, 10 parts by weight, 10.5 parts by weight, 11 parts by weight, 11.5 parts by weight, 12 parts by weight, 12.5 parts by weight, 13 parts by weight, 13.5 parts by weight, 14 parts by weight, 14.5 parts by weight, 15 parts by weight, 15.5 parts by weight, 16 parts by weight, 16.5 parts by weight, 17 parts by weight, 17.5 parts by weight, 18 parts by weight, 18.5 parts by weight, 19 parts by weight, 19.5 parts by weight, or 20 parts by weight, relative to 100 parts by weight of the hydroxyl group-containing (meth)acrylate and the alkyl group-containing (meth)acrylate. Within this range, the organic nanoparticles can secure good properties in terms of modulus of the adhesive film at high temperature, foldability of the adhesive film at room temperature and high temperature, and viscoelasticity of the adhesive film at low temperature and/or room temperature.

The organic nanoparticles may be prepared by typical emulsion polymerization, suspension polymerization, or solution polymerization.

The adhesive composition may further include a silane coupling agent. The silane coupling agent serves to allow the adhesive film to exhibit good reliability without bubbling or delamination even after being left in a frame having a predetermined radius of curvature under high temperature/humidity conditions for a predetermined period of time. The silane coupling agent may be a typical silane coupling agent known to those skilled in the art. For example, the silane coupling agent may include at least one selected from the group consisting of epoxylated silicon compounds, such as 3-glycidoxypropyltrimethoxysilane, 3-glycidoxypropyltriethoxysilane, 3-glycidoxypropylmethyldimethoxysilane, and 2-(3,4-epoxycyclohexyl)ethyltrimethoxysilane; polymerizable unsaturated group-containing silicon compounds, such as vinyltrimethoxysilane, vinyltriethoxysilane, and (meth)acryloxypropyltrimethoxysilane; amino group-containing silicon compounds, such as 3-aminopropyltrimethoxysilane, N-(2-aminoethyl)-3-aminopropyltrimethoxysilane, and N-(2-aminoethyl)-3-aminopropylmethyldimethoxysilane; and 3-chloropropyltrimethoxysilane, without being limited thereto. In an embodiment, the silane coupling agent is an epoxylated silane coupling agent. The silane coupling agent may be present in an amount of about 0.01 parts by weight to about 3 parts by weight, and, in an embodiment, about 0.01 parts by weight to about 1 part by weight, relative to 100 parts by weight of the hydroxyl group-containing (meth)acrylate and the alkyl group-containing (meth)acrylate. Within this range, the silane coupling agent can secure reliability of the adhesive film in a bent state under high temperature/humidity conditions as described above, and can provide a small difference in peel strength between low temperature, room temperature, and high temperature.

The adhesive composition may further include a crosslinking agent. The crosslinking agent can increase mechanical strength of the adhesive film through improvement in crosslinking degree of the adhesive composition. The crosslinking agent may include a polyfunctional (meth)acrylate capable of being cured by active energy rays. In an embodiment, the crosslinking agent may include any of: bifunctional acrylates such as 1,4-butanediol di(meth)acrylate, 1,6-hexanediol di(meth)acrylate, neopentylglycol di(meth)acrylate, polyethyleneglycol di(meth)acrylate, neopentylglycol adipate di(meth)acrylate, dicyclopentanyl di(meth)acrylate, caprolactone-modified dicyclopentenyl di(meth)acrylate, ethylene oxide-modified di(meth)acrylate, di(meth)acryloxyethyl isocyanurate, allylated cyclohexyl di(meth)acrylate, tricyclodecane dimethanol (meth)acrylate, dimethylol dicyclopentane di(meth)acrylate, ethylene oxide-modified hexahydrophthalic acid di(meth)acrylate, tricyclodecane dimethanol (meth)acrylate, neopentylglycol-modified trimethylpropane di(meth)acrylate, adamantane di(meth)acrylate, and 9,9-bis[4-(2-acryloyloxyethoxy)phenyl] fluorine; trifunctional acrylates such as trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, trifunctional urethane (meth)acrylates, tris(meth)acryloxyethyl isocyanurate; tetrafunctional acrylates such as diglycerin tetra(meth)acrylate and pentaerythritol tetra(meth)acrylate; pentafunctional acrylates such as dipentaerythritol penta(meth)acrylate; and hexafunctional acrylates such as dipentaerythritol hexa(meth)acrylate, caprolactone-modified dipentaerythritol hexa(meth)acrylate, and urethane (meth)acrylates (for example, reaction products of an isocyanate monomer and trimethylolpropane tri(meth)acrylate), without being limited thereto. These crosslinking agents may be used alone or in combination thereof. In an embodiment, the crosslinking agent is a polyfunctional (meth)acrylate of polyhydric alcohol. The crosslinking agent may be optionally present in an amount of about 0.001 parts by weight to about 5 parts by weight, and, in an embodiment, about 0.003 parts by weight to about 3 parts by weight, and, in an embodiment, about 0.005 parts by weight to about 1 part by weight, relative to 100 parts by weight of the hydroxyl group-containing (meth)acrylate and the alkyl group-containing (meth)acrylate. Within this range, the adhesive film exhibits good adhesion and improved reliability.

The adhesive composition may further include any of typical additives, such as curing accelerators, ionic liquids, lithium salts, inorganic fillers, softeners, molecular weight regulators, antioxidants, anti-aging agents, stabilizers, adhesion-imparting resins, reforming resins (polyol, phenol, acrylic, polyester, polyolefin, epoxy, epoxidized polybutadiene resins, and the like), leveling agents, defoamers, plasticizers, dyes, pigments (coloring pigments, extender pigments, and the like), processing agents, UV blocking agents, fluorescent whitening agents, dispersants, heat stabilizers, photostabilizers, UV absorbers, antistatic agents, coagulants, lubricants, solvents, and the like.

The adhesive composition may have a viscosity at 25° C. of about 300 cP to about 50,000 cP. Within this viscosity range, the adhesive composition can have good coatability and thickness uniformity.

The adhesive composition may be prepared through partial polymerization of the monomer mixture for the (meth) acrylic copolymer having a hydroxyl group with the initiator, followed by adding an additional initiator and at least one of the macro-monomer and the organic nanoparticles. The crosslinking agent and the additives described above may be further added to the adhesive composition. Alternatively, the adhesive composition may be prepared by partially polymerizing a mixture including the monomer mixture for the (meth)acrylic copolymer having a hydroxyl group and the initiator, followed by adding the additional initiator and at least one of the macro-monomer and the organic nanoparticles. The crosslinking agent and the additives described above may be further added to the mixture. Partial polymerization may include solution polymerization, suspension polymerization, photopolymerization, bulk polymerization, or emulsion polymerization. In an embodiment, solution polymerization may be performed at about 50° C. to about 100° C. by adding an initiator to the monomer mixture. The initiator may include a photopolymerization initiator, such as an acetophenone compound including 2,2-dimethoxy-2-phenylacetophenone, 1-hydroxycyclohexylphenylketone, and the like, without being limited thereto. Partial polymerization may be performed to achieve a viscosity at 25° C. of about 300 cPs to about 50,000 cPs, and, in an embodiment, 500 cPs to 9,000 cPs. The adhesive film may be produced by a typical method. For example, the adhesive film may be produced by coating the adhesive composition onto a release film, followed by curing. Curing may be performed under a low-pressure lamp at a wavelength of about 300 nm to about 400 nm and a dose of about 400 mJ/cm$^2$ to about 3,000 mJ/cm$^2$ in an oxygen-free state.

An optical member according to an embodiment of the present invention includes an optical film, and an adhesive film formed on at least one surface of the optical film, wherein the adhesive film includes the adhesive film according to an embodiment of the present invention. Accordingly, the optical member exhibits good bending properties and/or good foldability, and thus can be used in a flexible display.

In one or more embodiments, the optical film provides optical functions, for example, polarization, optical compensation, display quality improvement, and/or conductivity, to a display. Examples of the optical film may include a window film, a window, a polarizing plate, a color filter, a retardation film, an elliptical polarizing film, a reflective film, an anti-reflection film, a compensation film, a brightness improving film, an alignment film, a light diffusion film, a glass shatterproof film, a surface protective film, an OLED device barrier layer, a plastic LCD substrate, and a transparent electrode film, including indium tin oxide (ITO), fluorinated tin oxide (FTO), aluminum-doped zinc oxide (AZO), carbon nanotubes (CNT), Ag nanowires, graphene, or the like. These optical films may be easily manufactured by those of ordinary skill in the art.

For example, a touch pad may be attached to a window film or an optical film via the adhesive film, thereby forming a touch panel. Alternatively, the adhesive film may be applied to a typical polarizing film as in the related art.

In another embodiment, the optical film is an optically transparent film, and an optical member including the optical film and the adhesive film may act as a support layer for a display element. For example, the display element may include a window film and the like. The window film may include the optical member and a window coating layer (for example, a silicon coating layer) formed on the optical member. In an embodiment, the optical film may have a total luminous transmittance of 90% or more in the visible range and may be formed of at least one resin selected from among cellulose resins such as triacetylcellulose, polyester resins such as polyethylene terephthalate, polyethylene naphthalate, polybutylene terephthalate and polybutylene naphthalate, polycarbonate resins, polyimide resins, polystyrene resins, poly(meth)acrylate resins such as poly(methyl methacrylate), cyclic olefin polymer resins, acrylic resins, and polyamide resins. The optical film may have a thickness of 10 μm to 100 μm, and, in an embodiment, 20 μm to 75 μm, and, in an embodiment, 30 μm to 50 μm. Within this thickness range, the optical member can be used as the support layer for the display element.

The optical member may be a two-layer film laminate that includes an optical film and an adhesive film formed on a surface of the optical film. Alternatively, the optical member may be a three- or more layer film laminate that includes at least two optical films attached to each other via the adhesive film according to the present invention.

In one embodiment, the optical member may be a three-layer film laminate that includes a first optical film, a second optical film, and an adhesive film interposed between the first optical film and the second optical film to attach the first optical film to the second optical film, wherein the adhesive film is an adhesive film according to the present invention. Each of the first optical film and the second optical film may be formed of at least one resin selected from among a polyethylene terephthalate resin, a polycarbonate resin, a polyimide resin, a poly(meth)acrylate resin, a cyclic olefin polymer resin, and an acrylic resin. Each of the first optical film and the second optical film may have a thickness of 10 μm to 100 μm, and, in an embodiment, 20 μm to 75 μm, and, in an embodiment, 30 μm to 50 μm, and the adhesive film may have a thickness of 10 μm to 100 μm. Within this thickness range, the optical member can maximize or increase impact resistance while maintaining good foldability. The first optical film and the second optical film may have different thicknesses and may be formed of different materials.

An optical display according to an embodiment of the present invention includes an adhesive film according to the present invention. The optical display may include any of an organic light emitting display, a liquid crystal display, and the like. The optical display may include a flexible display. In one or more embodiments, the optical display may include a non-flexible display.

Next, a flexible display according to an embodiment of the present invention will be described with reference to FIG. 1. FIG. 1 is a sectional view of a flexible display according to an embodiment of the present invention.

Referring to FIG. 1, a flexible display 100 according to an embodiment of the present invention includes a display part 110, an adhesive layer 120, a polarizing plate 130, a touch-screen panel 140, and a flexible window film 150, wherein the adhesive layer 120 may include an adhesive film according to an embodiment of the present invention.

The display part 110 serves to drive the flexible display 100, and may include a substrate and an optical device including an OLED, an LED, a quantum dot light emitting diode (QLED), or an LCD element formed on the substrate. Although not shown in FIG. 1, the display part 110 may include a lower substrate, a thin film transistor, an organic light emitting diode, a flattening layer, a protective layer, and an insulating layer.

The polarizing plate 130 can realize polarization of internal light or prevent or substantially prevent reflection of external light to realize a display, or can increase contrast of the display. The polarizing plate 130 may be composed of a polarizer alone. Alternatively, the polarizing plate 130 may include a polarizer and a protective film formed on one or both surfaces of the polarizer. Alternatively, the polarizing plate 130 may include a polarizer and a protective coating layer formed on one or both surfaces of the polarizer. As the polarizer, the protective film and the protective coating layer, a typical polarizer, a typical protective film, and a typical protective coating layer known in the art may be used.

The touchscreen panel 140 generates electrical signals through detection of variation in capacitance when a human body or a conductor, such as a stylus, touches the touchscreen panel 140, and the display part 110 may be driven by such electrical signals. The touchscreen panel 140 is formed by patterning a flexible conductor and may include first sensor electrodes and second sensor electrodes each formed between the first sensor electrodes and intersecting the first sensor electrodes. The touchscreen panel 140 may include a conductive material such as metal nanowires, conductive polymers, and carbon nanotubes, without being limited thereto.

Although the touchscreen panel 140 may be stacked on the polarizing plate 130 via an adhesive film or a bonding film, alternatively, the touchscreen panel 140 may be integrally formed with the polarizing plate 130 by incorporating the polarizer or the polarizing plate therein.

The flexible window film 150 is formed as the outermost layer of the flexible display 100 to protect the flexible display.

Although not shown in FIG. 1, one or more adhesive films according to embodiments of the present invention may be further formed between the polarizing plate 130 and the touchscreen panel 140 and/or between the touchscreen panel 140 and the flexible window film 150 to reinforce bonding between the polarizing plate 130, the touchscreen panel 140, and the flexible window film 150.

Next, the present invention will be described in detail with reference to some examples. However, it should be understood that these examples are provided for illustration only and are not to be construed in any way as limiting the present invention.

PREPARATIVE EXAMPLE

Organic nanoparticles were prepared by emulsion polymerization. The core was formed of poly(butyl acrylate) and the shell was formed of poly(methyl methacrylate). In the organic nanoparticles, the shell was present in an amount of 35 wt % and the core was present in an amount of 65 wt %, and the organic nanoparticles had an average particle diameter of 100 nm and an index of refraction of 1.48.

Example 1

100 parts by weight of a monomer mixture of the hydroxyl group-containing (meth)acrylate and the alkyl group-containing (meth)acrylate as listed in Table 1, 5 parts by weight of the organic nanoparticles prepared in Preparative Example, and 0.005 parts by weight of Irgacure 651 as an initiator were sufficiently mixed in a reactor. After replacing dissolved oxygen in the reactor with nitrogen gas, the mixture was subjected to partial polymerization through irradiation with UV light for several minutes using a low-pressure mercury lamp, thereby preparing a viscous liquid having a viscosity of 5,000 cP at 25° C. 0.3 parts by weight of an initiator (Irgacure184), 0.01 parts by weight of hexanediol diacrylate as a crosslinking agent, and 0.1 parts by weight of 3-glycidoxypropyltrimethoxysialne (KBM-403) as a silane coupling agent were added to the viscous liquid and mixed therewith, thereby preparing an adhesive composition. The adhesive composition was coated onto a polyethylene terephthalate (PET) release film and irradiated with UV light at a dose of 2,000 mJ/cm$^2$, thereby preparing an adhesive sheet in which an adhesive film is stacked on the PET film.

Examples 2 to 6

Each adhesive sheet of an adhesive film and a PET film was fabricated in the same manner as in Example 1 except that the components of the adhesive composition were changed as listed in Table 1.

Comparative Examples 1 and 2

Each adhesive sheet of an adhesive film and a PET film was fabricated in the same manner as in Example 1 except that the components of the adhesive composition were changed as listed in Table 1.

The adhesive films of the Examples and Comparative Examples were evaluated as to the properties as listed in Table 1, and evaluation results are shown in Table 1.

(1) Bubble generation area in evaluation of durability: An adhesive film was obtained by releasing the PET film from each of the adhesive sheets prepared in the Examples and Comparative Examples. A specimen having a rectangular shape (length×width: 13 cm×3 cm) was prepared by sequentially stacking a polyethylene terephthalate film (thickness: 50 μm), the adhesive film (thickness: 100 μm) and a polyethylene terephthalate film (thickness: 100 μm) to have a three-layer structure, and was bent towards the PET film (thickness: 50 μm) such that the specimen was placed between frames having a gap of about 1 cm therebetween and the length of the specimen was halved. Then, the bubble generation area of the specimen was evaluated by repeating the following cycle 10 times. As the bubble generation area, a ratio of the total area occupied by bubbles to the area of the adhesive film was calculated by analyzing an image obtained through an optical microscope (EX-51, Olympus Co., Ltd.) with Mac-view software (Mountech Co., Ltd.).

<1 cycle> gradually increasing a temperature from 25° C. to 60° C. for 2 hours while maintaining 93% relative humidity (RH)→leaving the specimen under constant conditions of 60° C. and 93% RH for 3.5 hours→gradually decreasing the temperature to 25° C. for 2 hours while maintaining 93% RH→gradually increasing the temperature from 25° C. to 60° C. for 2 hours while maintaining 93% RH→leaving the specimen under constant conditions of 60° C. and 93% RH for 3.5 hours→gradually decreasing the temperature to 25° C. for 2 hours while maintaining 93% RH→leaving the specimen under constant conditions of 25° C. and 93% RH for 2 hours→gradually decreasing the temperature to −10° C. for 0.5 hours→leaving the specimen at constant condition of −10° C. for 3.5 hours→gradually increasing the temperature to 25° C. for 1 hour while maintaining 93% RH→leaving the specimen under constant conditions of 25° C. and 93% RH for 2 hours.

(2) Bubble generation area in evaluation of thermal impact: A specimen was prepared in the same manner as in (1) and the bubble generation area of the specimen was evaluated. The specimen was bent towards the PET film (thickness: 50 µm) such that the specimen was placed between frames having a gap of about 1 cm therebetween and the length of the specimen was halved, followed by repeating the following cycle 30 times. The bubble generation area was calculated in the same manner as in (1).

<1 cycle> leaving the specimen at constant condition of −40° C. for 2 hours→leaving the specimen at constant condition of 85° C. for 2 hours.

Figure 2A:
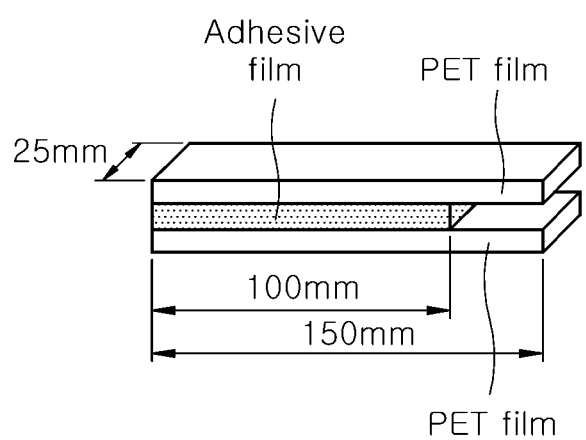
FIGS. 2A and 2B are diagrams illustrating measurement of peel strength in experimental examples.
Figure 2B:
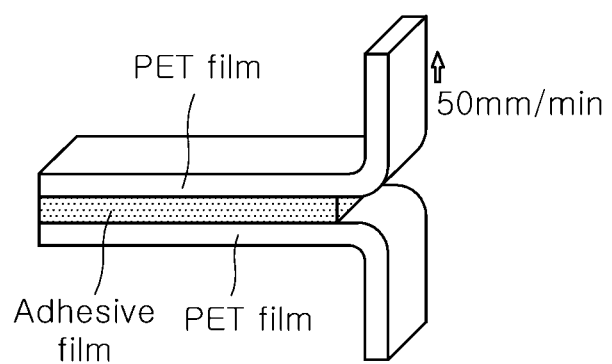

(3) Peel strength: An adhesive film having a size of 100 mm×25 mm×100 µm (length×width×thickness) was obtained by releasing the PET film from each of the adhesive sheets prepared in the Examples and Comparative Examples. One surface of a PET film having a size of 150 mm×25 mm×75 µm (length×width×thickness) was subjected to corona treatment twice (total dose: 156) under plasma discharge at 78 doses using a corona treatment device. The corona-treated surfaces of the PET films were stacked on both surfaces of the adhesive film, thereby preparing a specimen, as shown in FIG. 2A. The specimen was autoclaved under conditions of about 3.5 bar and about 50° C. for about 1,000 seconds and secured to a TA.XT_Plus texture analyzer (Stable Micro System Co., Ltd.). Referring to FIG. 2B, with each of the PET films secured at one side thereof to the TA.XT_Plus Texture Analyzer at 25° C. or at 60° C., T-peel strength was measured by pulling the other side of each of the PET films at 50 mm/min.

(4) Modulus: Viscoelasticity was measured under auto-strain conditions at a shear rate of 1 rad/sec and a strain of 1% using a rheometer (MCR-501, Anton Paar Co., Ltd.). Adhesive sheets each including a 50 µm thick adhesive film and a PET film were prepared using the adhesive compositions prepared in the Examples and Comparative Examples. 50 µm thick adhesive films were stacked to a thickness of 500 µm, followed by punching the stack using an 8 mm diameter punching machine, thereby preparing a specimen. With a load of 300 gf applied to the specimen using an 8 mm jig, measurement of modulus was performed at −20° C., 25° C., and 80° C. while increasing temperature from −60° C. to 90° C. at a rate of 5° C./min.

Figure 3A:
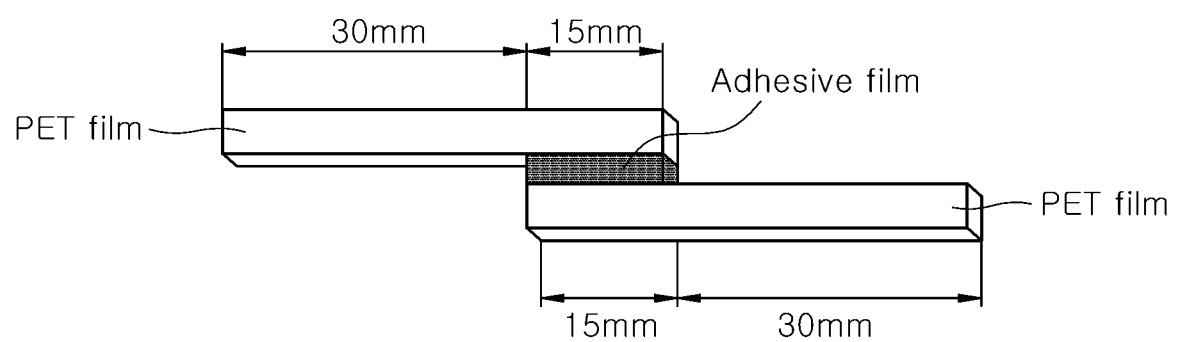
FIGS. 3A and 3B are diagrams illustrating measurement of creep in experimental examples.
Figure 3B:
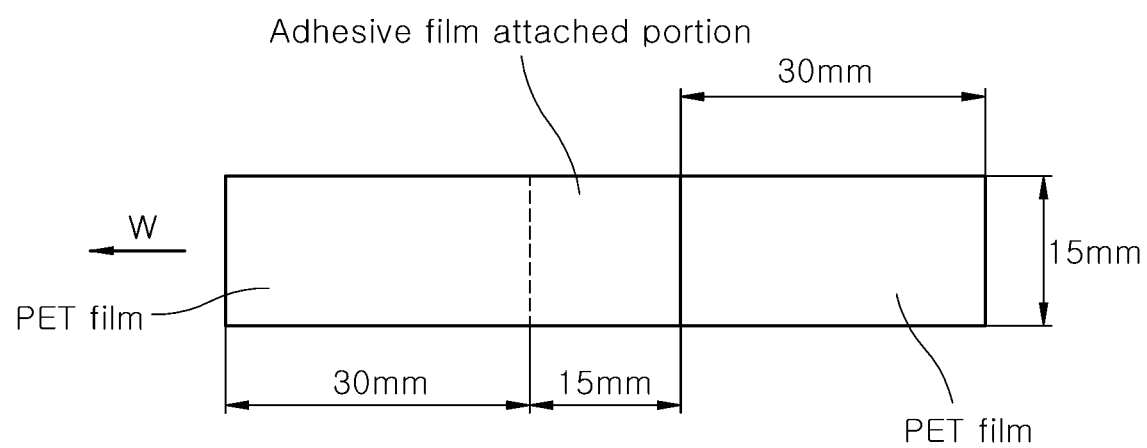

(5) Creep: Referring to FIGS. 3A and 3B, a specimen was prepared by attaching both ends of a PET film (45 mm×15 mm) via an adhesive film (15 mm×15 mm) to have a stepped cross-sectional shape ( ⌐⌐ ). The contact area between the PET film and the adhesive film was the same as the area of the adhesive film (15 mm×15 mm). With one PET film of the specimen secured to a TA (TA.XT Plus Texture Analyzer (Stable Micro System Co., Ltd.)), another PET film of the specimen was pulled by a force W of 500 gf at 0.6 mm/min for 600 sec to measure a pushed distance of the adhesive film at 25° C.

(6) Glass transition temperature: Glass transition temperature was measured using a DSC Q20 (TA Instruments). For example, an adhesive film was heated to about 100° C. at a rate of about 10° C./min, maintained at about 100° C. for about 5 minutes, slowly cooled to about −120° C. at a rate of about 10° C./min, and maintained at about −120° C. for about 10 minutes. Subsequently, the adhesive film was heated from about −120° C. to about 160° C. at a rate of 10° C./min in order to obtain an endothermic transition curve. An inflection point of the endothermic transition curve was determined as the glass transition temperature.

(7) Foldability Evaluation: A PET film (thickness: 50 µm), an adhesive film (thickness: 100 µm) and a PET film (thickness: 50 µm) were sequentially stacked, attached to one another using a roller, left at room temperature for 12 hours, and cut into a specimen having a size of length× width: 70 mm×140 mm. Then, the specimen was secured to a flexibility evaluation instrument (CFT-200, Covotech Co., Ltd.) using an adhesive (4965, Tesa Co., Ltd.). Here, each of the PET films was subjected to corona treatment and attached to the adhesive film such that the corona-treated surfaces of the PET films were attached to the adhesive film. The specimen was subjected to 100,000 cycles of bending in the width direction of the specimen at 60° C. and 93 RH at a bending rate of 30 cycles per minute such that the bent portion of the specimen had a radius of curvature of 3 mm (1 cycle refers to an operation of bending the adhesive film to have the radius of curvature and unfolding the adhesive film to an original state thereof after maintaining the adhesive film in the bent state for 1 second). After 100,000 cycles of bending, a specimen suffering from delamination or bubble generation was rated as × and a specimen having no delamination or bubble generation was rated as ○.

TABLE 1

|  | E1 | E2 | E3 | E4 | E5 | E6 | CE1 | CE2 |
|---|---|---|---|---|---|---|---|---|
| n-BA (parts by weight) | 5 | 5 | 10 | 10 | — | — | 24 | 15 |
| 2-EHA (parts by weight) | 75 | 78 | 75 | 75 | 80 | 80 | 75 | 65 |
| 4-HBA (parts by weight) | 15 | 15 | 10 | 5 | 20 | 20 | 1 | 15 |
| 3-HPA (parts by weight) | 5 | 2 | 5 | 10 | — | — | — | 5 |
| DEAA (parts by weight) | — | — | — | 1 | — | 1 | 1 | 1 |
| Organic nanoparticles (parts by weight) | 5 | 5 | 3 | 3 | 5 | — | 5 | — |
| Macro-monomer (parts by weight) | — | — | — | — | — | 5 | — | — |
| Crosslinking agent (parts by weight) | 0.01 | 0.01 | — | — | 0.01 | 0.01 | 0.01 | — |
| Silane coupling agent (parts by weight) | 0.1 | 0.1 | 0.1 | 0.1 | 0.1 | 0.1 | 0.1 | 0.1 |
| Bubble Durability | 0 | 0 | 0 | 0 | 0 | 0 | 15.3 | 4.6 |

TABLE 1-continued

|  |  | E1 | E2 | E3 | E4 | E5 | E6 | CE1 | CE2 |
|---|---|---|---|---|---|---|---|---|---|
| generation area ratio (%) | Thermal impact | 0 | 0 | 0 | 0 | 0 | 0 | 6.8 | 2.7 |
| Peel strength (gf/in) | @25° C. | 1428 | 1372 | 1324 | 1464 | 1570 | 1333 | 862 | 1401 |
|  | @60° C. | 974 | 773 | 579 | 670 | 742 | 653 | 268 | 476 |
| Peel strength reduction ratio (%) of Equation 1 | | 31.7 | 43.6 | 56.2 | 54.2 | 52.7 | 51.0 | 68.9 | 66.0 |
| Peel strength difference (gf/in) of Equation 2 | | 454 | 599 | 745 | 794 | 828 | 680 | 594 | 925 |
| Modulus (kPa) | @−20° C. | 140 | 132 | 105 | 124 | 84 | 97 | 65 | 118 |
|  | @25° C. | 42 | 35 | 27 | 30 | 35 | 34 | 19 | 37 |
|  | @80° C. | 30 | 28 | 18 | 21 | 23 | 18 | 9 | 15 |
| Creep (μm) | | 65 | 77 | 119 | 36 | 93 | 43 | 85 | 69 |
| Glass transition temperature (° C.) | | −56.1 | −57.3 | −57.2 | −55.5 | −57.7 | −53.2 | −59.4 | −54.2 |
| Foldability evaluation | | ○ | ○ | ○ | ○ | ○ | ○ | X | X | n-BA: n-butyl acrylate,
2-EHA: 2-ethylhexyl acrylate,
4-HBA: 4-hydroxybutyl acrylate,
3-HPA: 3-hydroxybutyl acrylate,
DEAA: diethylaminoethyl acrylate,
macro-monomer: AA-6 (Toakosei),
crosslinking agent: 1,6-hexanediol diacrylate,
silane coupling agent: 3-glycidoxypropyltrimethoxysilane As shown in Table 1, the adhesive films of the Examples had a small bubble generation area ratio under temperature variation or thermal impact conditions of high temperature, room temperature and low temperature, and thus could secure good durability and reliability to extend life span of a display. Further, the adhesive films of the Examples could reduce the peel strength reduction ratio of peel strength at high temperature to peel strength at room temperature and had a small difference in modulus between low temperature and high temperature, thereby securing good durability and reliability.

Accordingly, one or more embodiments of the present invention provide an adhesive film that has a small bubble generation area ratio under temperature variation or thermal impact conditions of high temperature, room temperature, and low temperature to extend life span of a display by securing good durability and reliability. One or more embodiments of the present invention provide an adhesive film that can reduce the peel strength reduction ratio of peel strength at high temperature to peel strength at room temperature. One or more embodiments of the present invention provide an adhesive film that has a small modulus difference between low temperature and high temperature to allow less deformation even upon temperature variation. One or more embodiments of the present invention provide an adhesive film having good foldability. One or more embodiments of the present invention provide an optically transparent adhesive film to be used in an optical display.

It is to be understood that various modifications, changes, alterations, and equivalent embodiments can be made by those skilled in the art without departing from the spirit and scope of the present invention.

What is claimed is:

1. An adhesive film formed of a monomer mixture comprising a hydroxyl group-containing (meth)acrylate and an alkyl group-containing (meth)acrylate,
the adhesive film having a bubble generation area ratio of 0%, as measured on a specimen having length×width of 13 cm×3 cm by repeating the following cycle 10 times, in which the specimen is prepared by sequentially stacking a polyethylene terephthalate (PET) film having a thickness of 50 μm, the adhesive film having a thickness of 100 μm, and a polyethylene terephthalate film having a thickness of 100 μm to have a three-layer structure, and is bent towards the PET film having the thickness of 50 μm such that the specimen is placed between frames having a gap of about 1 cm therebetween and the length of the specimen is halved and the cycle is sequentially accomplished for 24 hours,
where the cycle is defined by gradually increasing a temperature from 25° C. to 60° C. for 2 hours while maintaining 93% relative humidity (RH), leaving the specimen under constant conditions of 60° C. and 93% RH for 3.5 hours, gradually decreasing the temperature to 25° C. for 2 hours while maintaining 93% RH, gradually increasing the temperature from 25° C. to 60° C. for 2 hours while maintaining 93% RH, leaving the specimen under constant conditions of 60° C. and 93% RH for 3.5 hours, gradually decreasing the temperature to 25° C. for 2 hours while maintaining 93% RH, leaving the specimen under constant conditions of 25° C. and 93% RH for 2 hours, gradually decreasing the temperature to −10° C. for 0.5 hours, leaving the specimen at constant condition of −10° C. for 3.5 hours, gradually increasing the temperature to 25° C. for 1 hour while maintaining 93% RH, and leaving the specimen under constant conditions of 25° C. and 93% RH for 2 hours,
wherein the adhesive film further comprises: organic nanoparticles,
wherein the organic nanoparticles are present in an amount of about 0.1 parts by weight to about 20 parts by weight relative to 100 parts by weight of the hydroxyl group-containing (meth)acrylate and the alkyl group-containing (meth)acrylate, wherein the adhesive film has a storage modulus at 25° C. of about 15 kPa to about 90 kPa, wherein the organic nanoparticles have a core-shell structure, wherein the core of the organic nanoparticles consists of at least one selected from the group consisting of poly(alkyl (meth)acrylate), polysiloxane, and polybutadiene, the poly(alkyl (meth)acrylate) is at least one selected from the group consisting of poly(methyl acrylate), poly(ethyl acrylate), poly(propyl acrylate), poly(butyl acrylate), poly(isopropyl acrylate), poly(hexyl acrylate), poly(hexyl methacrylate), poly(ethylhexyl acrylate), and poly(ethylhexyl methacrylate), and wherein the shell of the organic nanoparticles consists of at least one selected from the group consisting of poly(methyl methacrylate) (PMMA), poly(ethyl methacrylate), poly(propyl methacrylate), poly(butyl methacrylate), poly(isopropyl methacrylate), poly(isobutyl methacrylate), and poly(cyclohexyl methacrylate).

2. The adhesive film according to claim 1, wherein the adhesive film has a bubble generation area ratio of 0%, as measured by repeating the following cycle 30 times on the specimen bent towards the PET film having the thickness of 50 μm such that the specimen is placed between frames having a gap of about 1 cm therebetween and the length of the specimen is halved: leaving the specimen at constant condition of −40° C. for 2 hours, and leaving the specimen at constant condition of 85° C. for 2 hours.

3. The adhesive film according to claim 1, wherein the adhesive film has a peel strength reduction ratio of 60% or less, as represented by the following Equation 1:

Peel strength reduction ratio=$|B-A|/A \times 100$, where A is a peel strength of the adhesive film at 25° C. and B is a peel strength of the adhesive film at 60° C.

4. The adhesive film according to claim 3, wherein the adhesive film has a peel strength of about 500 gf/in or more, as represented by B in Equation 1.

5. The adhesive film according to claim 1, wherein the adhesive film has a creep at 25° C. of about 10 μm to about 400 μm.

6. The adhesive film according to claim 1, wherein the adhesive film has a modulus at 80° C. of about 10 kPa to about 500 kPa.

7. The adhesive film according to claim 1, wherein the adhesive film has a modulus at −20° C. of about 20 kPa to about 500 kPa.

8. The adhesive film according to claim 1, wherein the adhesive film has a ratio of modulus at 80° C. to modulus at −20° C. of about 1:1 to about 1:10.

9. The adhesive film according to claim 1, comprising: a (meth)acrylic copolymer having a hydroxyl group formed of the monomer mixture, wherein the hydroxyl group-containing (meth)acrylate is present in an amount of about 5 wt % to about 40 wt % and the alkyl group-containing (meth)acrylate is present in an amount of about 60 wt % to about 95 wt % in the total amount of the hydroxyl group-containing (meth)acrylate and the alkyl group-containing (meth)acrylate.

10. The adhesive film according to claim 1, wherein the monomer mixture further comprises at least one of an ethylene oxide-containing monomer and an amine group-containing monomer.

11. The adhesive film according to claim 1, wherein the organic nanoparticles have an average particle diameter of about 10 nm to about 400 nm.

12. The adhesive film according to claim 1, wherein the core and the shell satisfies the following Equation 3:

$Tg(c)<Tg(s)$, where $Tg(c)$ is a glass transition temperature of the core, and $Tg(s)$ is a glass transition temperature of the shell.

13. The adhesive film according to claim 1, further comprising:

a macro-monomer, wherein the macro-monomer is present in an amount of about 0.1 parts by weight to about 20 parts by weight relative to 100 parts by weight of the hydroxyl group-containing (meth)acrylate and the alkyl group-containing (meth)acrylate.

14. An optical member comprising an optical film and an adhesive film formed on at least one surface of the optical film, wherein the adhesive film comprises the adhesive film according to claim 1.

15. The optical member according to claim 14, wherein the optical film is a first optical film, and the optical member is a three-layer film laminate comprising the first optical film, a second optical film, and the adhesive film between the first optical film and the second optical film to attach the first optical film to the second optical film.

16. The optical member according to claim 15, wherein each of the first optical film and the second optical film is formed of at least one resin selected from among a polyester resin, a polycarbonate resin, a polyimide resin, a poly(meth)acrylate resin, a cyclic olefin polymer resin, and an acrylic resin.

17. The optical member according to claim 15, wherein each of the first optical film and the second optical film has a thickness of about 10 μm to about 100 μm, and the adhesive film has a thickness of about 10 μm to about 100 μm.

18. An optical display comprising the optical member according to claim 14.

19. A window film comprising:

the optical member according to claim 14; and a window coating layer on the optical member.

* * * * *